July 15, 1958
F. L. WILLMAN
2,843,412
HANDLE FOR BARREL BOLTS AND CATCHES
Filed Dec. 19, 1955
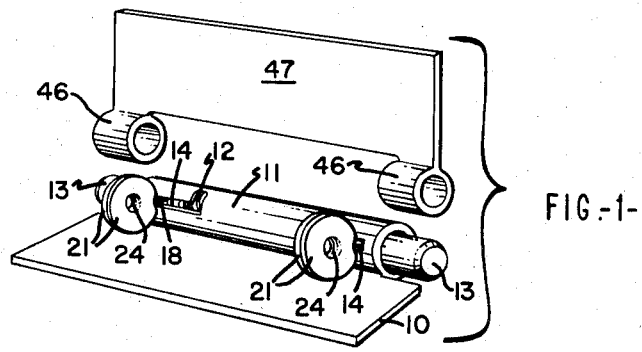
FIG.-1-
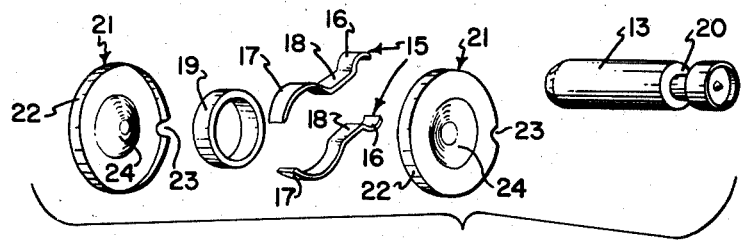
FIG.-2-
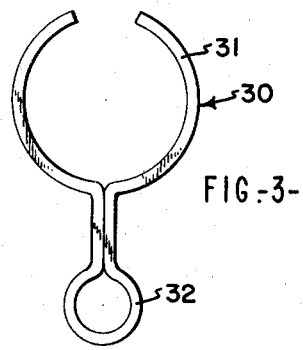
FIG.-3-
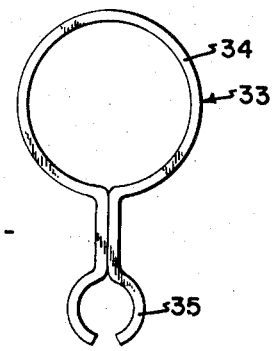
FIG.-4-
FRANK L. WILLMAN
*INVENTOR.*
BY Robert C. Comstock
HIS ATTORNEY

2,843,412
HANDLE FOR BARREL BOLTS AND CATCHES

Frank L. Willman, Los Angeles, Calif.

Application December 19, 1955, Serial No. 553,828

5 Claims. (Cl. 292—347)

This invention relates to a handle which is particularly adapted for use with barrel bolts, catches and similar fastening devices.

It is an object of my invention to provide a new and improved handle construction for the plungers of barrel bolts and catches, which handle construction is particularly adapted for use with plungers of relatively small diameter. The handle constructions which are presently in use on such devices do not adapt themselves to efficient use in connection with a small diameter plunger.

It is a further object of my invention to provide such a handle which is strong and which is also easy to assemble and to attach to the plunger. The parts used to form my device and their method of assembly and attachment to the plunger and to each other are novel in the art.

It is more particularly an object of my invention to provide a handle of the type described which attaches to the plunger in such a manner that it does not enlarge the diameter of the plunger and thus, in the case of a barrel bolt or catch, does not interfere with the reciprocal movement of the plunger along the barrel.

It is also among the objects of my invention to provide a handle of the type described in which only one fastening operation is required to assemble the handle and simultaneously secure it to the plunger. The fastening operation may comprise a simple spot welding of two contacting surfaces.

My invention also comprises such other objects, advantages and capabilities as will later more fully appear and which are inherently possessed by my invention.

While I have shown in the accompanying drawings preferred embodiments of my invention, it should be understood that the same are susceptible of modification and change without departing from the spirit of my invention.

Referring to the drawings,

Fig. 1 is a perspective view of a comple double-action barrel bolt separated from the receiving means, showing my handles in use;

Fig. 2 is an exploded perspective view of a preferred embodiment of my handle and plunger;

Fig. 3 is a side elevational view of the frame member of another embodiment of my invention;

Fig. 4 is a side elevational view of the frame member of still another embodiment of my invention.

One embodiment which has been selected to illustrate my invention is adapted to be used in connection with a conventional spring-action catch or barrel bolt. The barrel bolt structure includes a plate 10, the lower end of which is curved back on itself to form a cylindrical hollow barrel 11, which extends along one edge of the plate 10.

Mounted within the center portion of the barrel 11 is a coil spring 12, the opposite ends of which exert outwardly directed pressure against the inner ends of a pair of elongated cylindrical plungers 13, which are reciprocally mounted within the barrel 11, adjacent the opposite ends thereof. The barrel 11 is provided adjacent its ends with a pair of substantially L-shaped slots 14, the longer portion of which extends longitudinally with respect to the barrel 11.

The coil spring 12 normally urges the plungers 13 so that their ends extend outwardly from the opposite ends of the barrel 11. The slots 14 are provided for connection of the plunger handles which permit manual retraction of the plungers 13 back into the barrel 11 against the pressure of coil spring 12 to release the catch.

The above described structure is that of a conventional double action barrel bolt or spring biased catch. Such devices are also constructed with only a single plunger, as well. The novelty of my invention lies in the construction and method of attachment of the handle to the plunger or plungers.

My handle comprises a pair of identically formed elongated frame members 15, which are preferably formed of metal. Each of the frame members 15 has a small arcuate portion 16 at one end thereof, a larger arcuate portion 17 at the opposite end thereof and a straight portion 18 therebetween. The arcuate portions 16 and 17 preferably comprise arcs of approximately 60°.

A ring 19, which is also preferably formed of metal, has an outer diameter which substantially corresponds to the inner diameters of the larger arcuate portions 17 of the frame members 15. In assembling my handle, the frame members 15 are disposed with their larger arcuate portions 17 fitting snugly around the opposite sides of the ring 19. The straight portions 18 extend substantially parallel to each other.

The plunger 13 of the barrel bolt is provided with a circumferential groove 20 which extends to a depth at least equal to the thickness of the small arcuate portions 16 of the frame members 15. My handle is attached to the plunger 13 by mounting the small arcuate portions 16 of the frame members 15 in the groove 20 on opposite sides of the plunger 13.

The frame members 13 are then fastened together by means of a pair of identically formed covers 21, which are likewise preferably formed of metal. Each of the covers 21 is substantially circular in shape and has an integral substantially right angular flange 22 extending around its entire periphery except for a small cut-out portion 23. The center of the cover 21 is provided with a depressed hemispherical portion 24, which extends to substantially the same point as the edge of the flange 22. The flange 22 and hemispherical portion 24 thus define a circular portion which is adapted to receive the ring 19 and larger arcuate portions 17 of the frame members 15.

The covers 21 are fitted on opposite sides of the ring 19 and larger arcuate portions 17, with their hemispherical portions 24 fitting into the center of the ring 19 and their flanges 22 fitting around the outer edges of the larger arcuate portions 17. The straight portions 18 of the frame members 15 extend through the cut-out portion 23.

The bottom surfaces of the hemispherical portions 24 are provided with small slightly flattened portions at their centers, which are brought into close proximity to each other. The assembly of my handle is preferably completed by spot welding these flat portions to each other, an operation which is easily and rapidly accomplished from the outside of the covers 21.

The cut-out portions 23 of the covers 21 are preferably so small that the edges of the flanges 22 on opposite sides thereof contact the outside surfaces of the frame members 18 and act to force the straight portions 18 together. The edges of the flanges 22 also prevent any movement of the frame members 15 and thus insure the connection of the handle to the plunger 13.

My handle is attached to the plunger 13 so that the straight portions 18 extend through the slot 14 in barrel 11. The covers 21 provide a portion which may easily be gripped by the fingers and moved inwardly against the action of the coil spring 12. When the straight portions 18 reach the inner end of the longitudinal portion of the slot 14, the end of the plunger has been withdrawn into the end of the barrel 11. If the plunger is to be locked in retracted position, the straight portions 18 are moved into the connecting transverse portion of the slot 14, the edge of which prevents outward movement of the straight portions 18.

Another embodiment of my invention which is shown in Fig. 3 of the drawings is constructed in substantially the same manner but the frame members 15 are replaced by a single frame member 30 having a large open ring 31 at one end thereof and a smaller closed ring 32 at the opposite end. The smaller ring 32 is fitted around the plunger groove and the handle assembled in the same manner described above.

Still another embodiment of my invention is shown in Fig. 4, in which the frame members 15 are replaced by the single frame member 33 having a large closed ring 34 at one end thereof and a smaller open ring 35 at the opposite end. The open ring 35 is fitted into the plunger groove and the handle assembled in the same manner described above.

I claim:

1. A handle for barrel bolts and the like comprising a pair of substantially identically formed frame members, each of said frame members having a smal arcuate portion at one end thereof, a larger arcuate portion at the opposite end thereof and a straight portion therebetween, a substantially circular ring, the larger arcuate portions of said frame members fitting around said ring, said barrel bolt having a plunger, a circumferential groove extending around said plunger, the smaller arcuate portions of said frame members fitting around the opposite sides of said plunger and lying entirely within said groove, and a pair of identically formed circular covers, each of said covers having a flange extending therearound except for a small cut-out portion, each of said covers having a depressed hemispherical portion adjacent the center thereof, said hemispherical portion having a flat portion on the bottom thereof, said covers being disposed on opposite sides of said ring and frame members, with said ring and the larger arcuate portions of said frame members fitting within the circular area defined by the flange and spherical radius of each of said covers, the straight portions of said frame members extending through the cut-out portions of said covers, the flat portions of said hemispherical portions being spot welded to each other.

2. A handle for barrel bolts and the like having a reciprocal plunger, said handle comprising a pair of substantially identically formed frame members, each of said frame members having an arcuate portion at each end thereof, a ring, said frame members having one arcuate portion thereof fitting around said ring, the plunger of said bolt having a groove, the other arcuate portions of said frame members fitting around the opposite sides of said plunger and disposed within said groove, and a pair of substantially identically formed circular covers, each of said covers having a depressed portion adjacent the center thereof, each of said covers having an inwardly directed flange extending around the periphery thereof, said covers being disposed on the opposite sides of said ring and frame members, with said ring and the adjacent arcuate portions of said frame members fitting within the area defined by the flanges and the depressed portions of said covers, the depressed portions of said covers being attached together.

3. A handle for barrel bolts and the like, having a reciprocal plunger with an annular groove, said handle comprising a frame having a small rounded portion at one end thereof, and a larger rounded portion at the opposite end thereof, said small rounded portion adapted to fit around said plunger within said groove, and a pair of substantially identically formed circular covers, each of said covers having a depressed portion adjacent the center thereof, each of said covers having a flange extending around the periphery thereof, said covers being disposed on opposite sides of said frame, with the larger rounded portion of said frame fitting within the area defined by the flanges and the depressed portions of said covers, the depressed portions of said covers being attached together.

4. A handle for barrel bolts and the like having a reciprocal plunger with an annular groove, said handle comprising a frame having a small rounded portion at one end thereof and larger rounded portion at the opposite end, said small rounded portion adapted to fit said plunger within said groove, and a pair of substantially identically formed circular covers, each of said covers having a flange extending around the periphery thereof, said covers being disposed on opposite sides of said frame, with the larger rounded portion of said frame fitting within hte flanges of said covers.

5. The structure described in claim 4, each of said covers having a depressed portion, said depressed portions fitting within the larger rounded portion of said frame.

References Cited in the file of this patent

UNITED STATES PATENTS

| | | |
|---|---|---|
| 907,085 | McNutt | Dec. 15, 1908 |
| 919,750 | Neumeister | Apr. 27, 1909 |
| 1,098,378 | Gray | June 2, 1914 |
| 1,513,308 | Berry | Oct. 28, 1924 |
| 1,588,328 | Moore | June 8, 1926 |
| 1,698,695 | Frick | Jan. 8, 1929 |
| 2,077,120 | Lombard | Apr. 13, 1937 |
| 2,452,377 | Houseman | Oct. 26, 1948 |
| 2,536,295 | Leonard | Jan. 2, 1951 |

FOREIGN PATENTS

| | | |
|---|---|---|
| 213,130 | Great Britain | Mar. 27, 1924 |